E. A. QUINBY.
Compress for Trees.
No. 213,591. Patented Mar. 25, 1879.
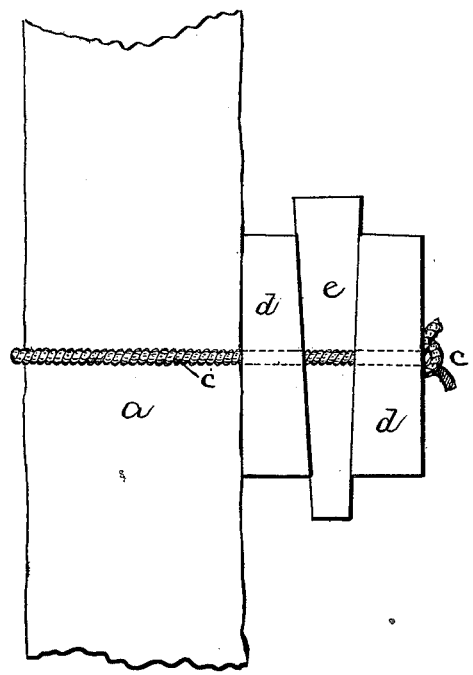
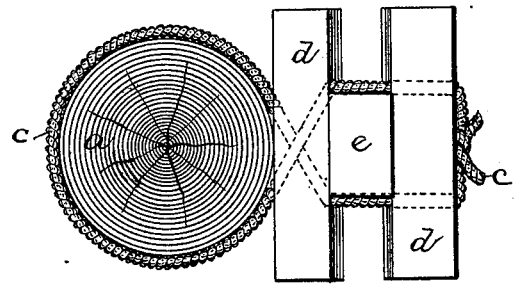
Witnesses:
J. W. Garner
H. S. D. Haines
Inventor:
E. A. Quinby
per
F. A. Lehmann,
atty

UNITED STATES PATENT OFFICE.

EZRA A. QUINBY, OF MEMORY, IOWA.

IMPROVEMENT IN COMPRESSES FOR TREES.

Specification forming part of Letters Patent No. 213,591, dated March 25, 1879; application filed February 15, 1879.

*To all whom it may concern:*

Be it known that I, E. A. QUINBY, of Memory, in the county of Taylor and State of Iowa, have invented certain new and useful Improvements in Compresses for Trees; and I do hereby declare the following to be a full, clear, and exact description of the invention, such as will enable others skilled in the art to which it pertains to make and use it, reference being had to the accompanying drawings, which form part of this specification.

My invention relates to an improvement in a compress for fruit-trees; and it consists in a tarred or waterproofed rope or cord, two blocks, through which the rope is passed, and a pyramidal wedge to force the blocks apart, and thus tighten the rope around the tree, as will be more fully described hereinafter.

Figure 1 is a side elevation of my invention, and Fig. 2 is a plan view of the same.

a represents a fruit-tree, around which is passed the tarred or otherwise waterproofed rope or cord c. The two ends of this rope are passed outward through the two holes made in each of the two blocks d, and then tied or otherwise fastened together. Forced downward between the two blocks is a wedge, e, which serves to force the two blocks apart, and at the same time spreads the cords sidewise between the blocks, and thus tightens the rope around the tree to any desired extent with the shortest possible wedge.

By the waterproofing the rope is prevented from being affected by the moisture in the atmosphere; and hence will not expand and contract, and by the use of the two blocks a much greater amount of tightening can be done by a small wedge, as herein described, than in any other way.

As is well known, the sap of a tree in the summer and autumn returns to the roots, leaving the branches comparatively deprived of all sappy substances until the spring, when the sap again returns to them. If the sap can be prevented from returning to the roots, the limbs will mature much earlier, and not only bear fruit sooner than they otherwise would do, but in greater quantities.

The object of my invention is to produce a simple, cheap, and efficient compress for trees, which will prevent the return of the sap to the roots sufficiently to affect the tree on the principle of dwarfing, and that without injury to the trees.

Having thus described my invention, I claim—

A compress for trees, composed of the rope c, blocks d, and wedge e, substantially as shown and described.

In testimony that I claim the foregoing I have hereunto set my hand and seal this 30th day of January, 1879.

EZRA A. QUINBY. [L. S.]

Witnesses:
 J. D. NELSON,
 W. P. JEFFREY, A. M.